United States Patent [19]

Skerrett

[11] Patent Number: 4,958,542
[45] Date of Patent: Sep. 25, 1990

[54] FIBERGLASS TUBE END TAPERING DEVICE

[76] Inventor: Oliver C. Skerrett, P.O. Box 249, Cedar Mt., N.C. 28718

[21] Appl. No.: 238,148

[22] Filed: Aug. 30, 1988

[51] Int. Cl.⁵ .............................................. B23B 3/22
[52] U.S. Cl. ........................................ 82/113; 82/128
[58] Field of Search ................... 82/15, 17, 151, 170, 82/113, 128; 407/33

[56] References Cited

U.S. PATENT DOCUMENTS

| | | | |
|---|---|---|---|
| 1,340,474 | 5/1920 | Cashman | 407/33 |
| 3,875,832 | 4/1975 | Mayfield | 82/113 |
| 3,999,452 | 12/1976 | Larson | 82/113 |
| 4,114,484 | 9/1978 | Feamster | 82/113 |
| 4,257,289 | 11/1981 | Groothius | 82/113 |
| 4,287,796 | 9/1981 | Palmer | 82/113 |
| 4,449,871 | 5/1984 | Hilleslad | 82/113 |
| 4,601,222 | 7/1986 | Gill | 82/113 |
| 4,691,600 | 9/1987 | Carlson et al. | 82/113 |

Primary Examiner—Frederick R. Schmidt
Assistant Examiner—Blynn Shideler
Attorney, Agent, or Firm—J. B. Dickman, III

[57] ABSTRACT

A pipe tapering apparatus having an expandable mandrel for centering the apparatus on a pipe end and a cylindrical cutting head connectable to a power unit for rotation in the mandrel while tapering the outside surface of the pipe end section. The cutting head having a segmented body with removable cutting blades set at an angle to taper the pipe end.

5 Claims, 1 Drawing Sheet

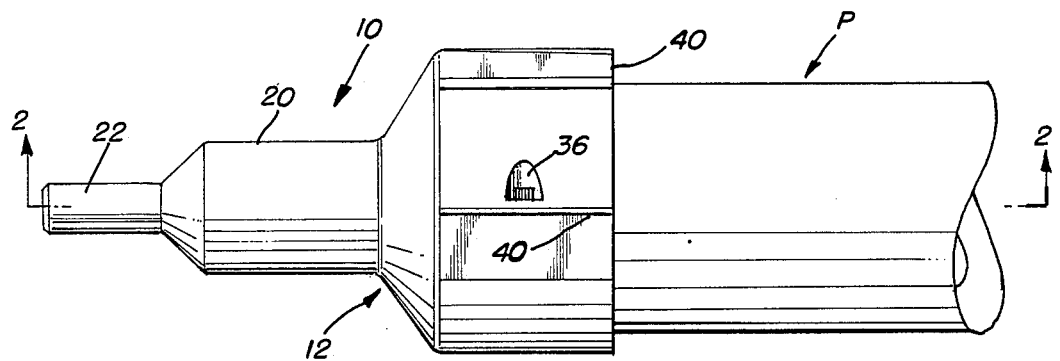
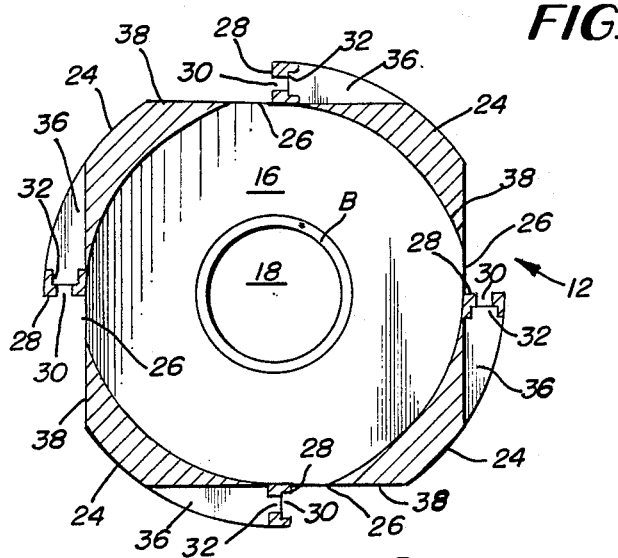
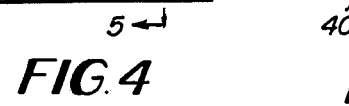
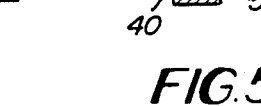
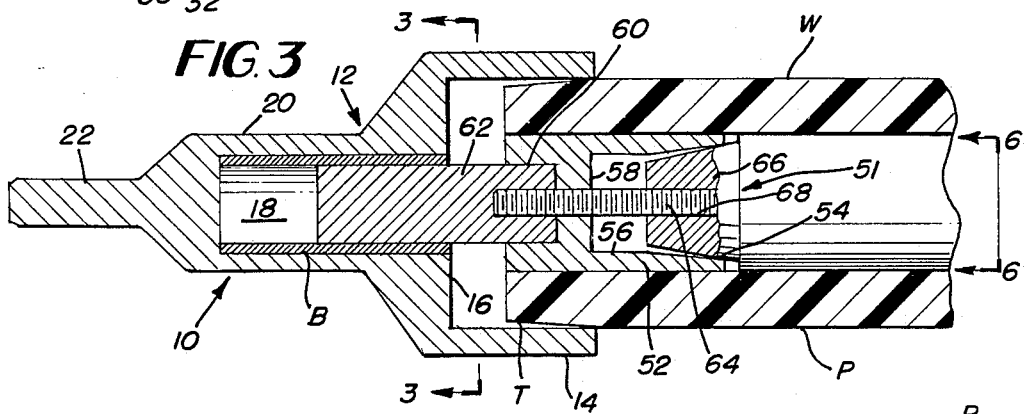
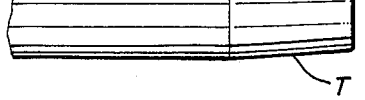

FIBERGLASS TUBE END TAPERING DEVICE

FIELD OF THE INVENTION

A pipe beveling apparatus is used to bevel the outer surfaces of ends of pipes to facilitate the bonding of two pipes together and to facilitate the bonding of pipes to fittings and couplings.

BACKGROUND OF THE INVENTION

The use of reinforced fiberglass pipes as plumbing and gas lines is widely accepted in many sections of the country. While wide acceptance has been given to the use of fiberglass pipes, the mechanics who install the plumbing and gas lines have experienced problems with the mating of pipe joints, fittings and couplings. Adhesives bond the pipes and couplings together and unless the tolerances between the mating surfaces are close, the bond will not be the same all the way around the bonded area. To overcome the tolerance problems, several apparatuses and methods have been adopted to improve the close tolerances necessary to insure proper mating of pipes and couplings. Among the U.S. Patents on the subject, the following were found of interest:

U.S. Pat. No. 2,749,809 issued to Anderson
U.S. Pat. No. 3,875,832 issued to Mayfield
U.S. Pat. No. 3,999,452 issued to Larsen
U.S. Pat. No. 4,691,452 issued to Carlson et al Each of the above cited patents is directed to an apparatus for trimming tube ends. While only the Carlson et al patent is concerned with shaving plastic tubes it is obvious that any one of the apparatuses disclosed could find use in shaping plastic tubing or pipes. There are several common features in each of the cited patents, for example all of the apparatuses have a mandrel for centering the shaping tool on the tubing, and they have rotatable cutters for trimming the tubing end. However, as will become apparent the patents do not include the inventive features of the present invention, nor do they find themselves adaptable to the problem that this invention seeks to overcome.

SUMMARY OF THE PRESENT INVENTION

The present invention relates to an apparatus for tapering the ends of pipes to form closer tolerance fits between pipe joints and couplings, and in particular, to a tapering apparatus of simple structure with few moving parts and of high reliability.

The tapering apparatus has an expandable mandrel which inserts into the end of a pipe to be trimmed and expands evenly to center the apparatus relative to the diameter of the pipe. Once the mandrel is in place, a cylindrical cutting head is inserted on the mandrel for rotation by a power drill. Using a reciprocating action and slowly moving the cylindrical cutting head forward until it contacts the mandrel a taper is cut on the end of the tubing. After the cylindrical cutting head has been removed, the mandrel is removed.

A preferred embodiment of the invention is a pipe trimmer operable to remove the outer surface in a taper from an end section of a fiberglass pipe. The cylindrical cutting head has a cup shaped body having a segmented cylindrical wall with cutting blades on the segments to have inwardly facing cutting edges. The cutting blades are tapered to match the desired taper on the pipe. A drill shank projects from one end of the cylindrical cutting head for rotating the apparatus. The mandrel is made up of four parts: A female mandrel cup with an integral taper, a male wedge with an external taper to mate with the internal taper of the female mandrel cup, a mandrel shank and a threaded rod for drawing the male wedge into the female mandrel cup. The female mandrel cup has a segmented cylindrical wall that is forced outwardly by the male wedge to center the apparatus in a pipe

IN THE DRAWINGS

FIG. 1 is a side view of a taper apparatus of the present invention.

FIG. 2 is a cross sectional view of the taper apparatus of FIG. 2 taken along the line 2—2.

FIG. 3 is a cross sectional view along the line 3—3 of FIG. 2.

FIG. 4 is a plan view of a cutter blade of this invention.

FIG. 5 is a cross sectional view taken along the line 5—5 of FIG. 4.

FIG. 6 is an end view taken along the line 6—6 of FIG. 2 with the mandrel wedge removed.

FIG. 7 is a side view showing a tapered pipe end.

DESCRIPTION OF THE INVENTION

Referring to the drawing FIGS. 1 and 2 show a tapering apparatus 10 of the present invention mounted on a fiberglass reinforced pipe P. Tapering apparatus 10 is used to taper the outside circumferential end of pipe P, so that it will fit in close tolerence with pipe couplings or fittings. As shown in FIG. 7 pipe P has a tapered T that has been cut from the end by tapering apparatus 10. In use a coupling, not shown, is slipped over the tapered end T of pipe P. The inside diameter of the coupling that fits on the tapered end T of the pipe has a close tolerence fit on the pipe and is adhesively bonded to the pipe with an adhesive such as a thermosetting adhesive. FIG. 2 shows pipe P with a continuous cylindrical wall w made of plastic, such as thermoplastics, reinforced fiberglass plastic, PVC, etc.

A power drill, electric or air powered, is used to rotate the tapering apparatus 10. A chuck, (not shown), mounted on the output shaft of the power drill (not shown), has a typical collet assembly to tighten to tapering apparatus 10. The invention is not directed to a specific power unit, therefore other types of power units can be used to rotate the apparatus 10 to taper the end section T of the pipe P.

The tapering apparatus 10 of FIGS. 1 and 2 has a cylindrical cutting head 12 which has a cup shaped body 14 (FIG. 2), with a circular head 16. A tubular bore 18 centered in the circular end 16 is milled or drilled in a protruding shank 20 extending from the cup shaped body 14. An oilite bronze bushing "B" is pressed into tubular bore 18. The tubular bore 18 receives a mandrel shank which will be discussed later. The end of the shank 20 reduces to a drive shaft end 22 to fit in a drill chuck for rotation.

Turning again to the cylindrical cutting head 12, the cutting head can be die cast as a unitary member, including the cup shaped body 14 with its circular end 16 and the shank 20. As mentioned, a tubular bore 18 is milled or drilled in the shank 20. Since the cutting head 12 can be made of aluminum the bore 18 is easily created. The cup shaped body 14 has a segmented cylindrical wall 24 with each segment having an opening 26 separating it from the next segment. There is a cutting blade mounting face 28 with bore 30 and a land 32 for receiving a cap screw to hold a cutting blade in place. There is a milled area 36 to facilitate the insertion of a cap screw (not shown). A milled surface 38 on the edge opposite the blade mountinq face 28 cuts a cord through the circular cross section and aligns with the cutting blade of the next segment. In use, the cutting blade shaves material from the end of the pipe P, as the shaved material is cut away it is pushed out of the cutter head 12 by the cutter blade through the opening 26.

A typical cutting blade is shown in FIGS. 4 and 5. The cutting blade 40 has an angled cutting edge 42. A cross section of the cutting blade, FIG. 5 shows the cutting edge 42 and an indention 44. The indention 44 pushes the shaved material out of the cutting head 12. The cutting edge 42 has bottom face 46 at a slight angle of 12° for providing a better cutting angle. There is a stub projection 48 on the rear face of the cutting blade 40. A threaded bore so extends through the stub projection 48 to receive a cap screw that fastens the cutting blade 40 to the blade mounting face 28 of the cutting head 12. With the cutting blade 40 fastened to the cutting head 12, the angled cutting edge 42 is set at the proper taper to remove material. A taper angle of 1.75° works well for most close tolerance fits.

FIG. 2 shows an expandable mandrel 52 in place of pipe P. The mandrel assembly 52 has a cup shaped female member 54 with a cylindrical wall 56. A circular end wall 58 is integral with the closed end of the female member 54. A bore 60 on the back of the female member 54 receives a stub arbor 62. To hold the stub arbor 62 in the bore 60, a threaded rod 64 is threaded into the stub arbor 62 and through a threaded bore in the circular end wall 58. The threaded rod 64 also threads into a male wedge member 66. Male wedge member 66 has a threaded bore 68 so that turning the stub arbor 62 draws the wedge member 66 into the female member 54. The interior of the cylindrical wall 56 is tapered to match the taper of the wedge member 66. FIG. 6 shows the cylindrical wall 56 divided into segments 68 so that as the male wedge member 66 is drawn into the cup shaped cylindrical female member the segments 68 are forced against the interior surface of the pipe P.

Stub arbor 62 has a diameter almost the same size as the bore 18 in the protruding shank 20 of the cutting head 12. Therefore, after the mandrel assembly 51 is locked in the pipe P, the tapering apparatus 10 is rotatably mounted on the stub arbor 62. To insure that there is no wobbling of the tapering apparatus 10 as it rotates on the stub arbor 62 a bronze bushing 20 is inserted in the bore 18 and the close tolerance between the stub arbor and the bushing 20 eliminates wobbling and friction.

It should be realized that different size pipes may require different size taper apparatus. Also, many different materials may be used to make the tapering apparatus, even though aluminum has been suggested.

While only one embodiment of the invention has been shown, it is obvious that one skilled in the art may realize other embodiments, therefore one should consider the drawings, written description and claims for a complete understanding of the invention.

I claim:

1. A pipe end tapering apparatus for reducing the end section of a pipe to provide close tolerance connections with pipe couplings and fittings comprising:

an expandable mandrel assembly for inserting in a pipe end and expanded to give a stable centered stationary means to support a tapering apparatus means, said mandrel assembly has a shaft means projecting from the end of a pipe to support a tapering apparatus means;

a cylindrical tapering apparatus means rotatably and reciprocatively supported on said shaft means projecting from the end of the pipe end, said cylindrical tapering apparatus having a cup shaped body with a first end and a second end;

said cup shaped body having an end wall in said first end, a protruding shaft extending from said end wall and centered on said end wall and projecting from said cup shaped body;

said shaft protruding from said end wall having a bore extending through said end wall into said shaft to support said cylindrical tapering apparatus means on said mandrel assembly projecting shaft means, and a reduced end on said shaft for connection to a means for rotating and advancing said cylindrical tapering apparatus means on said mandrel shaft to taper the end of a pipe;

said cup shaped body having a segmented cylindrical wall means with openings separating each segment and a cutting blade mounting means on each segment;

a cutting blade means for mounting on said mounting means, said cutting blade means has a cutting edge which projects into said cup shaped body to shave a taper on the outside surface of a pipe end;

said cutting blade means having an elongated body where said cutting edge being an angled edge on said elongated body with one end of said elongated body being narrower than the other to provide said angled edge to produce a tapered end on said pipe, mounting means on said cutting blade means for connection with said mounting means on said segmented cylindrical wall means; and said second end of said cylindrical cup shaped body being of larger diameter than the pipe end section to fit over said end section as said tapering apparatus shaves a taper on the end section by rotation in a forward movement.

2. A tapering apparatus as in claim 1 wherein said cutting blade means has a rectangular cross section indentation adjacent to said cutting edge to push shave material from said cutter and said cutter edge on the bottom edge of the bottom face of said rectangular cross section, where said bottom face is angled away from said cutting edge to form a sharper cutting angle.

3. A tapering apparatus as in claim 2 wherein said cutting blade mounting means includes a threaded projection extending from the side opposite the cutting face, where said threaded projection inserts in a bore in said cutting blade mounting means on said cylindrical cup shaped body segmented wall means, and a fastening means engages said threaded projection to fasten said cutting blade to said mounting means.

4. A tapering apparatus as in claim 3 wherein said cutting blade edges have an angle of about 1.75° to provide a similar angle taper on said pipe end section.

5. A tapering apparatus as in claim 4 wherein said cutting blade means bottom face has an angle of about 12°.

* * * * *